(12) United States Patent
Cynkin et al.

(10) Patent No.: US 8,438,622 B2
(45) Date of Patent: May 7, 2013

(54) METHODS AND APPARATUS FOR AUTHORIZING ACCESS TO DATA

(75) Inventors: Laurence H. Cynkin, Chevy Chase, MD (US); Jay B. Roberts, Silver Spring, MD (US)

(73) Assignee: Honesty Online, LLC, Bethesda, MD (US)

( * ) Notice: Subject to any disclaimer, the term of this patent is extended or adjusted under 35 U.S.C. 154(b) by 1052 days.

(21) Appl. No.: 12/170,804

(22) Filed: Jul. 10, 2008

(65) Prior Publication Data

US 2010/0011431 A1    Jan. 14, 2010

(51) Int. Cl.
*G06F 7/04* (2006.01)

(52) U.S. Cl.
USPC .............................. 726/9; 713/159; 713/172

(58) Field of Classification Search ...... 726/9; 713/159, 713/168, 172
See application file for complete search history.

(56) References Cited

U.S. PATENT DOCUMENTS

| | | | |
|---|---|---|---|
| 6,055,637 A | 4/2000 | Hudson et al. | |
| 6,092,196 A | 7/2000 | Reiche | |
| 6,763,468 B2 | 7/2004 | Gupta et al. | |
| 6,892,307 B1 | 5/2005 | Wood et al. | |
| 6,971,017 B2 * | 11/2005 | Stringer et al. | 713/182 |
| 7,076,795 B2 | 7/2006 | Hahn | |
| 7,137,006 B1 | 11/2006 | Grandcolas et al. | |
| 7,174,383 B1 | 2/2007 | Biswas et al. | |
| 7,216,236 B2 | 5/2007 | Kou et al. | |
| 7,225,464 B2 | 5/2007 | Satyavolu et al. | |
| 7,340,525 B1 * | 3/2008 | Bhatia et al. | 709/229 |
| 7,346,775 B2 | 3/2008 | Gasparinl et al. | |
| 7,610,617 B2 * | 10/2009 | Kelly et al. | 726/5 |
| 7,734,648 B2 * | 6/2010 | Eberlein | 707/783 |
| 7,913,298 B2 * | 3/2011 | Bhatia et al. | 726/8 |
| 2002/0138728 A1 | 9/2002 | Parfenov et al. | |
| 2003/0200202 A1 * | 10/2003 | Hsiao et al. | 707/3 |
| 2004/0128506 A1 | 7/2004 | Blakley, III et al. | |
| 2006/0206932 A1 | 9/2006 | Chong | |
| 2007/0016943 A1 | 1/2007 | M'Raihi et al. | |
| 2007/0022196 A1 | 1/2007 | Agrawal | |
| 2007/0050635 A1 | 3/2007 | Popp | |
| 2007/0118875 A1 | 5/2007 | Chow et al. | |
| 2007/0130463 A1 | 6/2007 | Law et al. | |
| 2007/0220271 A1 * | 9/2007 | Law | 713/185 |
| 2007/0245414 A1 | 10/2007 | Chan et al. | |
| 2008/0086767 A1 * | 4/2008 | Kulkarni et al. | 726/9 |
| 2008/0244721 A1 * | 10/2008 | Barrus et al. | 726/9 |

* cited by examiner

*Primary Examiner* — Samson Lemma
(74) *Attorney, Agent, or Firm* — Cooley LLP

(57) ABSTRACT

In one embodiment, a method comprises receiving a request from a first party for access to controlled data, and providing access to the controlled data to a second party. The first party requests access to the controlled data and a token is provided to the first party. The token includes data associated with authorized access to the controlled data. A request for access to the controlled data including the token is later received from the second party, and access to the controlled data is provided to the second party.

21 Claims, 7 Drawing Sheets

METHODS AND APPARATUS FOR AUTHORIZING ACCESS TO DATA

BACKGROUND

The disclosed embodiments relate generally to authorizing access to data including, for example, between a user terminal and a server in a communications network. Apparatus and methods according to various embodiments are capable of, for example, authorizing and/or validating access to controlled data in a communication network.

Methods and apparatus for authorizing access to data are known. For example, single sign on server ("SSoS") systems allow a single computer server to authorize a user of a computer terminal for access to data located on another computer server in a communication network.

Such known methods and apparatus have been implemented in a variety of ways. One system redirects a computer terminal from a computer server housing data to an authentication computer server for authorization for access to the data when the user of the computer terminal attempts to access the data. The user can then authenticate with the authentication computer server, and the authentication computer server redirects the computer terminal back to the computer server housing the data for accessing the data.

Another known system allows a user of a computer terminal to authenticate with a computer server and then access other partner computer servers without authenticating with each partner computer server. Such systems are often implemented using data received by the computer terminal from the authenticating computer server. This data, often referred to as a cookie is stored on the computer terminal and sent to the partner computer servers by the computer terminal as an indication that the computer terminal is authorized to access the partner computer servers. In such a system, each of the authenticating computer server and the partner computer servers can interpret the data. For example, the data may be encrypted and each of the authenticating computer server and the partner computer servers have access to appropriate encryption keys for encrypting and/or decrypting the data.

Other such known systems pass data between the authenticating computer server and the partner computer servers to authorize the computer terminal for access to data on the partner computer servers. For example, a user of a computer terminal can authenticate with a computer server and then request data from a partner computer server. The partner computer server then requests an authentication status of the computer terminal from the authenticating computer server. If the authenticating computer server indicates to the partner computer server that the computer terminal is authenticated, the partner computer server provides to the computer terminal access to the data. If the authenticating computer server indicates to the partner computer server that the computer terminal is not authenticated, the partner computer server denies the computer terminal access to the data, or initiates an authentication process with the computer terminal.

Known methods of providing authorized and/or validated access to data suffer several disadvantages. For example, to access controlled data, users are often directed from one computer server or web page to another for authentication. After authenticating, users are then redirected to the computer server or web page hosting or displaying the data of interest. In some instances, a user is directed from one web page to another for authentication, and then redirected back to the original web page for accessing data. This repetitive change in web pages and shift in perspective can be an annoyance to users.

Additionally, some known methods and/or systems involve manual user intervention for at least a portion of a process. For example, some methods involve manual intervention to initiate or complete an authorization process. Such manual intervention can be an annoyance to and/or cause confusion for users.

In other known systems, multiple computer servers have access to encryption keys and/or are able to authorize access to data stored on other computer servers. These arrangements can raise significant security concerns and can be difficult to implement.

SUMMARY

In one embodiment, a method includes receiving a request from a first party for access to controlled data, and providing access to the controlled data to a second party. The first party requests access to the controlled data and a token is provided to the first party. The token includes data associated with authorized access to the controlled data. A request for access to the controlled data including the token is later received from the second party, and access to the controlled data is provided to the second party.

In another embodiment, a method comprises receiving a request from a first party for access to controlled data, requesting access to the controlled data from a second party, receiving a token from the second party, and providing the token and an identifier for accessing the controlled data to the first party. The identifier is associated with the resource. The first party is directed to the resource and provides the token to the resource. The token includes data associated with authorized access to the controlled data, and is configured such that the resource provides access to the controlled data to the first party.

DETAILED DESCRIPTION

One or more embodiments of methods and apparatus disclosed herein can provide authorized validated access to data. In one embodiment, a controlled-access server, a partner application that hosts web pages for a social-networking web site, and a user terminal are operatively coupled to a communication network. A user of the user terminal navigates to a web page of the partner application using a web browser running on the user terminal. The web page can be, for example, a web page associated with a member of the partner application social-networking site, and include information about the member. This information can include, for example, information managed personally by the member, information managed by the partner application based on input from the member, and/or information input by other members of the social-networking site. Such information is generally not verified for accuracy or truthfulness. Additionally, the information about the member can include an indication that additional verified information associated with the member is available from the controlled-access server. For example, an icon displayed within the web page in close proximity to a field representing the age of the member can be an indication that verified age information about the member is available.

The verified information and the controlled-access server can be managed by a party other than the partner application. This party can be, for example, a specialized agency that is capable of determining, managing, and/or verifying information about members of the social-networking site. The user of the user terminal can request access to the verified information by, for example, selecting or clicking on an icon indicating the availability of the verified information.

When the partner application social-networking site determines that the user has requested the verified data, the partner application determines whether it has access to the verified information. If the partner application determines that it does not have access to the verified information, the partner application can request access to the verified information from the controlled-access server for the user.

The controlled-access server receives the request for access to the verified information from the partner application and determines whether the partner application is authorized to request access to verified information. For example, the controlled-access server can compare an identifier of the partner application, such as an Internet protocol ("IP") address of the partner application, with identifiers in a database to determine if the identifier of the partner application is authorized to request access to verified information. If the partner application is authorized to request access to verified information, the controlled-access server can construct a token for providing access to the verified information. For example, the controlled-access server can encrypt a time and an identifier of the verified information to construct the token. The token is encrypted such that neither the partner application nor the user terminal can determine the contents of the token.

The controlled-access server sends the token to the partner application, and the partner application redirects the user terminal to a web page hosted by the controlled-access server for accessing the verified data. The partner application redirects the user terminal such that the token is provided to the user terminal, and the user terminal provides the token to the controlled-access server via the web page for accessing the verified data. For example, the partner application can send a redirect command to the user terminal including a uniform resource identifier ("URI") such as, for example, a uniform resource locator ("URL") of a web page for accessing the controlled data. In some embodiments, the token can be included in the URI such that the token is not cached by the user terminal.

The controlled-access server receives the token from the user terminal and decrypts the token to determine whether the token is valid. The controlled-access server can, for example, use a time encrypted in the token to determine whether the token has expired, and/or verify that an identifier encrypted in the token is associated with existing verified information. If the controlled-access server determines that the token is valid, the controlled-access server can provide access to the verified information to the user terminal by, for example, sending data associated with a web page and including the verified information to the user terminal. The user terminal can then display the web page including the verified information to the user.

In some embodiments, the verified data can be provided to the user terminal in a frame within the web page of the social-networking site or retrieved using inline linking such that it appears to the user of the user terminal that the user terminal is not redirected from the social-networking site.

As used in this specification, the singular forms "a," "an" and "the" include plural referents unless the context clearly dictates otherwise. Thus, for example, the term "a computer server" is intended to mean a single computer server or a combination of computer servers, "a processor" is intended to mean one or more processors, or a combination thereof.

Figure 1:
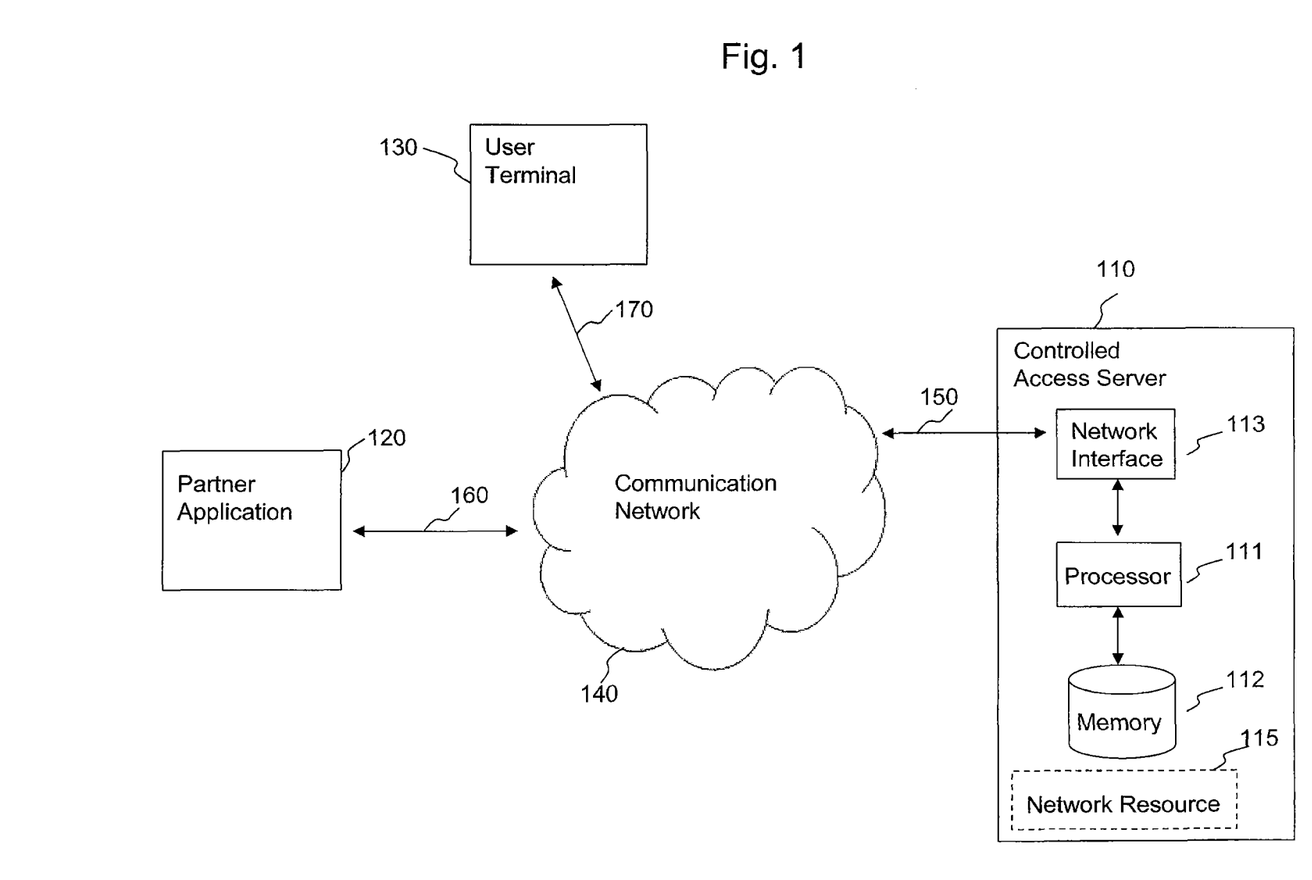
FIG. 1 is a block diagram of a system for authorized validated access to data over a communication network, according to an embodiment.

FIG. 1 is a block diagram of a system for authorized validated access to data over a communication network, according to an embodiment. As illustrated in FIG. 1, controlled-access server 110, partner application 120 and user terminal 130 are operatively coupled to communication network 140. A partner application can be, for example, a social networking site, a dating service, an employment web site, a web site for managing memberships in an organization, or another web-based application or web site configured to manage user information such as, for example, user profiles.

Communication network 140 can be any communications network configurable to allow controlled-access server 110, partner application 120 and user terminal 130 to communicate with communication network 140 and/or to each other through communication network 140. Communication network 140 can be any network or combination of networks capable of transmitting information (e.g., data and/or signals) and include, for example, a telephone network, an Ethernet network, a fiber-optic network, a wireless network, and/or a cellular network.

In some embodiments, communication network 140 can include multiple networks operatively coupled one to another by, for example, network bridges, routers, switches and/or gateways. For example, user terminal 130 can be operatively coupled to a cellular network, partner application 120 can be operatively coupled to an Ethernet network, and controlled-access server 110 can be operatively coupled to a fiber-optic network. The cellular network, Ethernet network and fiber-optic network can each be operatively coupled one to another via one or more network bridges, routers, switches and/or gateways such that the cellular network, the Ethernet network and the fiber-optic network are operatively coupled to form a communication network. Alternatively, for example, the cellular network, the Ethernet network and the fiber-optic network can each be operatively coupled to the Internet such that the cellular network, the Ethernet network, the fiber-optic network and the Internet are operatively coupled to form a communication network.

As illustrated in FIG. 1, controlled-access server 110 is operatively coupled to communication network 140 via network connection 150, partner application 120 is operatively coupled to communication network 140 via network connection 160, and user terminal 130 is operatively coupled to communication network 140 via network connection 170. Network connections 150, 160 and 170 can be any appropriate network connection for operatively coupling controlled-access server 110, partner application 120 and user terminal 130 to communication network 140.

In some embodiments, a network connection can be a wireless network connection such as, for example, a wireless fidelity ("Wi-Fi") or wireless local area network ("WLAN") connection, a wireless wide area network ("WWAN") connection, and/or a cellular connection. In some embodiments, a network connection can be a cable connection such as, for example, an Ethernet connection, a digital subscription line ("DSL") connection, a broadband coaxial connection, and/or a fiber-optic connection. In some embodiments, a user terminal, partner application and/or controlled-access server can be operatively coupled to a communication network by heterogeneous network connections. For example, a user terminal can be operatively coupled to the communication network by a WWAN network connection, a partner application can be operatively coupled to the communication network by a DSL network connection, and a controlled-access server can be operatively coupled to the communication network by a fiber-optic network connection.

Controlled-access server 110 includes processor 111, network interface 113 and memory 112. Controlled-access server 110 is operatively coupled to communication network 140 via network interface 113 and network connection 150. Network interface 113 can be any network interface configurable to be operatively coupled to communication network 140 via network connection 150. For example, a network interface can be a wireless interface such as, for example, a worldwide interoperability for microwave access ("WiMAX") interface, a high-speed packet access ("HSPA") interface, and/or a WLAN interface. A network interface can also be, for example, an Ethernet interface, a broadband interface, a fiber-optic interface, and/or a telephony interface.

Processor 111 is operatively coupled to network interface 113 such that processor 111 can be configured to be in communication with communication network 140 via network interface 113. Processor 111 can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules in programming languages as Java™, C++, C, assembly, a hardware description language, or any other suitable programming language. A processor according to some embodiments includes media and computer code (also can be referred to as code) specially designed and constructed for the specific purpose or purposes.

Processor 111 is also operatively coupled to memory 112. Memory 112 can be a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

In addition to memory 112, some embodiments include another processor-readable medium (not shown in FIG. 1) having instructions or computer code thereon for performing various processor-implemented operations. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; solid-state memory such as SSDs and FLASH memory; and ROM and RAM devices. Examples of computer code include, but are not limited to, micro-code or micro-instructions, machine instructions (such as produced by a compiler), and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

In some embodiments, a controlled-access server can be a virtual device implemented in software such as, for example, a virtual machine executing on or in a processor. For example, a controlled-access server can be a software module executing in a virtual machine environment such as, for example, a Java™ module executing in a Java™ Virtual Machine ("JVM"), or an operating system executing in a VMware™ virtual machine. In some such embodiments, a network interface, a processor, and a memory can be virtualized and implemented in software executing in, or as part of, a virtual machine.

As illustrated in FIG. 1, controlled-access server 110 includes network resource 115. Network resource 115 can be, for example, a web server and/or database accessible over communication network 140. Network resource 115 can, for example, send data formatted in hypertext markup language ("HTML") to user terminal 130, which user terminal 130 can display to a user.

In some embodiments, a network resource can include a database configured to process database queries received by a controlled-access server over a communication network. In some embodiments, a network resource can exchange encoded binary data, such as images and/or documents, for example, with a user terminal over a communication network.

Similar to controlled-access server 110, but not shown in FIG. 1, user terminal 130 and partner application 120 can each include a network interface, a processor and a memory. In some embodiments, a partner application can include one or more software modules as part of a computer server operatively coupled to a communication network.

Figure 2:
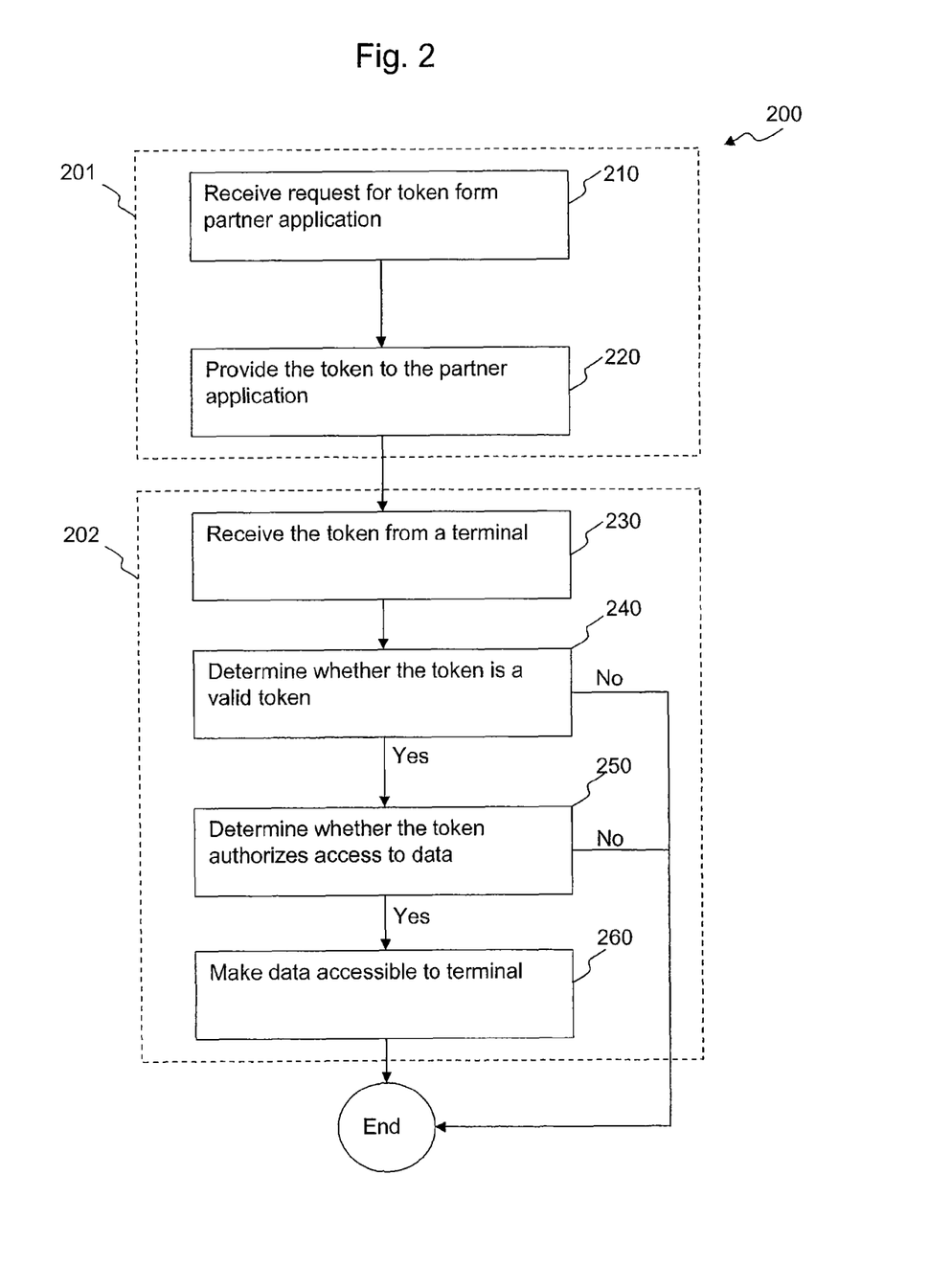
FIG. 2 is a flow chart of a process for providing authorized validated access to data, according to an embodiment.

FIG. 2 is a flow chart of a process for providing authorized validated access to data, according to an embodiment. In one embodiment, process 200 is implemented by a controlled-access server. A request for a token is received by the controlled-access server from a partner application, at 210. After a request for a token is received, a token in provided by the controlled-access server to the partner application, at 220. The token provided by the controlled-access server to the partner application is received from a terminal, at 230. After the token is received, at 240, the token can be analyzed to determine whether the token is a valid token. If the token is valid, the token can be analyzed to determine whether the token authorizes access to controlled data, at 250. At 260, the controlled data is made available to the terminal if the token authorizes access to the controlled data.

In some embodiments, process 200 can be implemented as two sub-processes, as illustrated in FIG. 2. Sub-process 201 includes steps 210 and 220 for receiving requests for tokens and providing tokens to a partner application. Sub-process 202 includes steps 230, 240, 250 and 260 for receiving tokens from terminals and providing access to controlled data to the terminals based on the token.

In some embodiments, process 200 and/or sub-processes 201 and 202 can be implemented as software modules. In other embodiments, process 200 and/or sub-processes 201 and 202 can be implemented as hardware modules. In yet other embodiments, process 200 and/or sub-processes 201 and 202 can be implemented as hardware and software modules.

Figure 3:
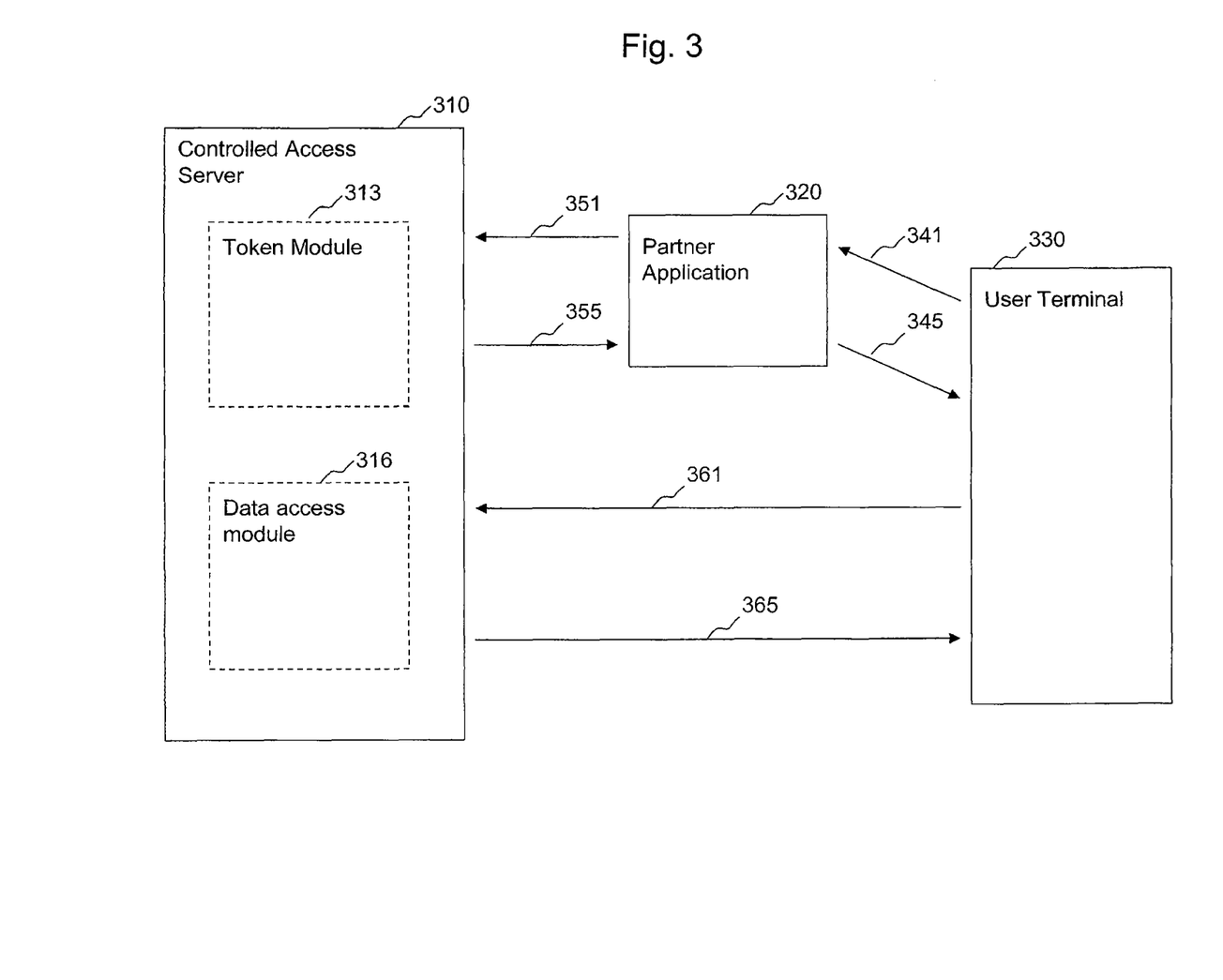
FIG. 3 is a block diagram of a system and shows message flows for authorized validated access to data, according to an embodiment.

FIG. 3 is a block diagram of a system and shows message flows for authorized validated access to data, according to an embodiment. Controlled-access server 310 includes token module 313 and data access module 316. Token module 313 is configured to receive requests for access to controlled data and provide a token. Data access module 316 is configured to receive a token and provide access to data based on the token.

In one embodiment, as illustrated in FIG. 3, user terminal 330 sends to partner application 320 a request for access controlled data managed by controlled-access server 310 in message 341. Controlled data can be, for example, data that has been verified or is maintained by controlled-access server 310. Examples of controlled data include verified personal information, financial information, and/or employment information. Partner application 320 receives the request in message 341 and sends a request for access to the controlled data to controlled-access server 310 in message 351.

In some embodiments, a partner application is configured to determine whether it has access to the controlled data before requesting the controlled data from a controlled-access server. In some embodiments, a partner application requests a token for accessing controlled data from a controlled-access server rather than requesting access to the controlled data.

Controlled-access server receives message 351 and token module 313 processes the request in message 351. Token module 313 processes the request, for example, by generating a token associated with access to the controlled data and sends the token in message 355 to the partner application.

In some embodiments, a token module verifies that the controlled-access server has access to the controlled data before sending a token to a partner application. In some embodiments, a token module includes in the token a time that can be used to validate the token. In some embodiments, a token module can include a reference or identifier of the controlled data in the token. In some such embodiments, the reference or identifier can be encrypted. In other embodiments, the reference or identifier is not encrypted such that a partner application and/or user terminal can access the reference or identifier.

In some embodiments, the token includes data associated with a partner application and/or a user of a partner application. In some embodiments, the token module includes other data such as, for example, diagnostic, debugging, analytical, and/or statistical information in the token. In some embodiments, the token includes some controlled data. For example, a portion of the controlled data, such as a name or other identifier of the controlled data is included in the token.

In some embodiments, the token or a portion of the token is encrypted. In some such embodiments, the token is encrypted such that neither a partner application nor a user terminal decrypt the token. For example, the token can be encrypted with a symmetric key encryption and/or using an encryption algorithm that is not shared with a partner application or a user terminal.

Partner application 320 receives message 355 including the token and sends the token to user terminal 330 in message 345. In addition to the token, message 345 includes an identifier or reference of a network resource, and is configured such that user terminal 330 is directed to the network resource when user terminal 330 receives message 345. For example, message 345 can include a redirect command and a URI. In some embodiments, the token can be included or encoded in a URI. The network resource can be a web server or web page associated with controlled-access server 310 and configured to facilitate communication between user terminal 330 and controlled-access server 310.

When user terminal 330 is directed to the network resource, message 361 including the token is sent to the network resource. The resource then passes the token to data access module 316. In some embodiments, a data access module can be configured to communicate directly with a user terminal. In such embodiments, the user terminal can be directed to the data access module, rather than to a network resource.

Data access module 316 receives the token and determines whether the token is valid. If the token is valid, data access module 316 provides access to the controlled data to user terminal 330. For example, as illustrated in FIG. 3, message 365 including the controlled data, or a representation of the controlled data, can be sent to user terminal 330. If the token is invalid, data access module 316 can indicate to user terminal 330 in message 365 that the token included in message 361 is invalid and/or that access to the controlled data has been refused.

In some embodiments, a data access module determines whether the token is valid based on a time included in the token. In some embodiments, a data access module receives an encrypted token and decrypts the encrypted token before determining whether the token is valid. In some embodiments, a data access module determines which controlled data should be made accessible to a user terminal based on a reference or identifier included in the token. In some embodiments, a data access module records information associated with one or more partner applications, user terminals, or other parties based on information included in a token. In some embodiments, a data access module determines whether a token authorizes access to controlled data based on information associated with one or more partner applications, user terminals, or other parties included in the token.

In some embodiments, controlled access module 310 can receive requests, send tokens, receive tokens, and provide access to controlled data using more or fewer modules. For example, a controlled-access server can include a single module configured to function as both a token module and a data access module. In other embodiments, a controlled-access server can include additional modules such as, for example, cryptographic modules capable of encrypting and/or decrypting data; database modules capable of storing and/or accessing data in one or more databases; web server modules capable of providing access by, for example, web browsers over the Internet to resources provided by the controlled-access server; and/or authentication modules capable of providing authentication for partner applications and/or other parties attempting to interface with the controlled-access server. Such modules can be implemented as software or in hardware such as, for example, ASICs.

Figure 4:
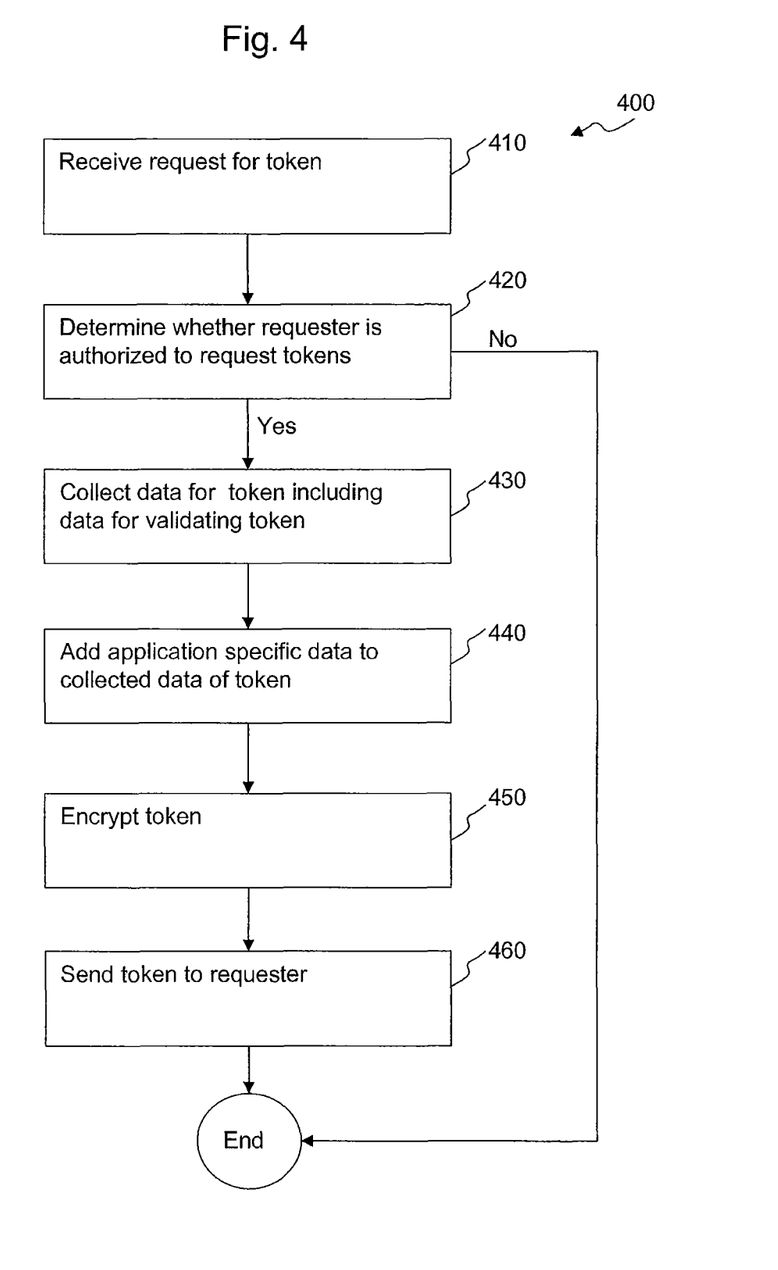
FIG. 4 is a flow chart of a process for generating a token for authorized validated access to data, according to an embodiment.

FIG. 4 is a flow chart of process 400 for generating a token for authorized validated access to data, according to an embodiment. A request for a token is received at 410. In one embodiment, a partner application explicitly requests a token for access to controlled or verified data. In another embodiment, a partner application implicitly requests a token for access to controlled or validated data with a request for access to the controlled or verified data.

After the request for a token is received, process 400 determines whether the requester is authorized to request a token at 420. In one embodiment, an identifier of a requester or, for example, a partner application is also received to determine whether the requester is authorized to request tokens. For example, in one embodiment, an IP address of the requester can be received and compared with a list or database of IP addresses authorized to request a token. In another embodiment, a medium access control ("MAC") address of the requester can be received and compared with a list or database of MAC addresses authorized to request a token. In other embodiments, other identifiers associated with the requester can be used to determine whether the requester is authorized to request tokens.

In some embodiments, a requester is authenticated with a computer server implementing process 400 before receiving and/or requesting a token. An authentication protocol such as, for example, Kerberos or pretty good privacy ("PGP"); digital certificates such as, for example, X.509; and/or other forms of authentication can be used to authenticate a requestor with a computer server. In some embodiments, an authenticated requestor is considered authorized to request tokens.

In some embodiments, the requester has a previously arranged relationship for authentication. For example, the requester can have previously registered an identifier, an encryption key, a digital certificate, and/or an identifier of a trusted third-party with a computer server implementing process 400. In some embodiments, the requester does not have a previously arranged relationship for authentication. For example, the requester and a computer server implementing process 400 can negotiate a security protocol using a handshaking procedure such as, for example, secure sockets layer ("SSL") or transport layer security ("TLS") to verify the identity or an identifier of the requester. In some such embodiments, the requester acts as a server in the handshaking procedure. In some embodiments, the requester can have a previously arranged relationship with a third party for verifying that the requester is authorized to request tokens.

If the requester is authorized to request tokens, data for the token is collected at 430. For example, a token can be formed from collected data and can be a string concatenation of the collected data. The token includes data for validating the token. Data for validating the token can be, for example, a date and/or time when the token expires; a date and/or time when the token was generated or created; a number used once (or "nonce"); and/or other data that can be used for validating the token.

As illustrated in FIG. 4, application specific data can be optionally added to collected data of the token at 440. Application specific data can include data associated with a partner application and/or a user of a partner application; diagnostic, debugging, analytical, and/or statistical information; data associated with controlled data such as an identifier or a location of the controlled data; and/or other data specific to a particular application of the token and/or process 400. In some embodiments, application specific data includes multiple types of data such as, for example, statistical information and a location of controlled data.

In some embodiments, application specific data can be associated with a user of a social-networking site or any other web site that maintains a user profile of users of the web site. For example, application specific data can be data from a user profile of a social-networking site such as the user's username, one or more usernames of other users of the social-networking site associated with the user, and/or an age of the user. In some embodiments, application specific data can be data associated with the user of a social-networking site requesting access to the controlled data. For example, a username of the user requesting access to controlled data associated with another user of the social-networking site can be included in a token.

In some embodiments, the token includes data associated with a single user. In other embodiments, the token includes data associated with two or more users and/or user groups. Such data can be interpreted by a controlled-access server receiving the token, and the controlled-access server can provide access to controlled data based on the data.

The collected data of the token can then be encrypted at step 450. The collected data of the token can be encrypted using any of a variety of encryption methods including private/public key encryption such as, for example, Rivest-Shamir-Adelman ("RSA") encryption; and/or symmetric encryption such as, for example, advanced encryption standard ("AES") or Blowfish. In some embodiments, a digest of the token is included in the encrypted token. In some embodiments, a computer server implementing process 400 does not reveal the encryption key to prevent other parties from decrypting the token. In some embodiments, unencrypted data is included with the collected data of the token to identify the token. For example, plain-text data identifying a computer server implementing process 400 can be included with the token.

The token is sent to the requester at 460. In some embodiments, an identifier and/or locator for accessing controlled data based on the token can also be sent to the requester. In other embodiments, data associated with the validity of the token can also be sent with the token. For example, a time before which the token is valid can be sent unencrypted to the requester to apprise the requester of when the token will become invalid.

In some embodiments, steps of process 400 can be rearranged. In some embodiments, more or fewer steps comprise process 400. For example, in one embodiment, no application specific data is included in the token. In some embodiments, a requester establishes a secure connection such as, for example, a secure shell ("SSH") tunnel with a computer server implementing a process similar to process 400, and requests received via the secure connection are considered by the computer server to be authorized. In some embodiments, a process includes requesting and/or receiving application specific data from the requester. In some embodiments, a process includes sending a reference or identifier of a network resource such as, for example, a URI of web page for accessing controlled data to a requester.

In some embodiments, a controlled-access server can provide multiple tokens to a partner application. For example, a partner application may request a predetermined number of tokens that will be valid for a period of time such as, for example, a 24-hour period or a one-month period. In some embodiments, a controlled-access server produces one or more tokens before a token is requested by a partner application. The controlled-access server can provide such tokens to a partner applications when the partner application requests a token. This can, for example, reduce a computational or operational load on a controlled-access server, decrease latency between a request for a token and providing a token, and/or increase operational efficiency of a controlled-access server and/or a partner application. For example, this can decrease the delay experienced by a user of a social-networking site after the user requests access to controlled data and until the user accesses the controlled data.

Figure 5:
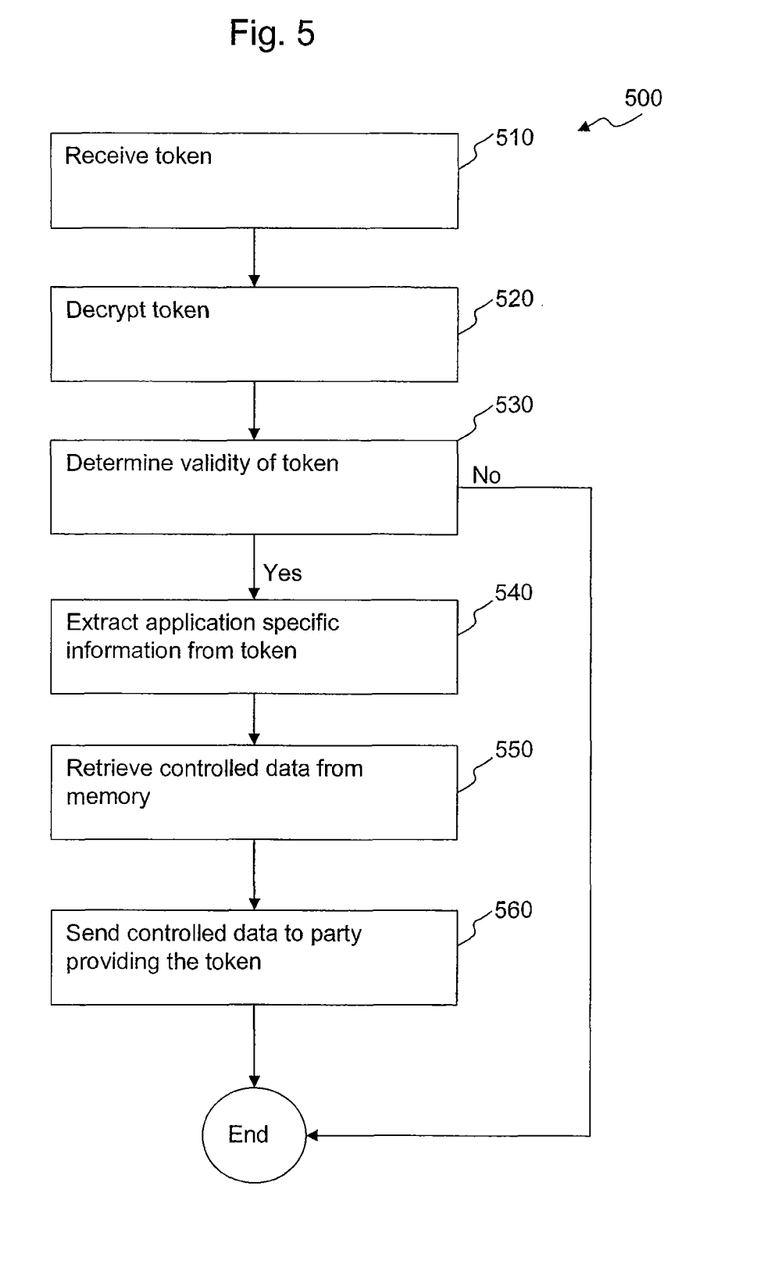
FIG. 5 is a flow chart of a process of providing authorized validated access to data, according to an embodiment.

FIG. 5 is a flow chart of a process of providing authorized validated access to data, according to an embodiment. A token, for example, a token generated by process 400, is received at 510. In some embodiments, the token is encrypted and is decrypted at 520. The validity of the token is determined at 530. In some embodiments, the validity of the token is determined based on a time and/or date included in the token. For example, the token can include the time at which it was produced and a computer server implementing process 500 is configured to accept the token as valid for a predetermined time after the time included in the token. In other embodiments, the token can include a start time and a time span during which the token is valid. In some embodiments, the validity of a token is determined based on a nonce included in the token.

In some embodiments, as illustrated in FIG. 5, application specific information is extracted from the token at 540. For example, the token can include a name or other identifier associated with controlled data. In some embodiments, a computer server implementing process 500 executes operations based on the application specific data. For example, a computer server implementing process 500 can process statistical information included in and/or associated with the token and/or controlled data.

At 550, controlled data is retrieved from a memory. In some embodiments, an identifier of the controlled data included in the token is used to determine which controlled data is to be retrieved. In other embodiments, a nonce is used to determine which controlled data is to be retrieved. For example, a single computer server can implement a process for providing a token such as process 400 and process 500, and can use a lookup table to associate a nonce with a particular file, database and/or other controlled data.

In some embodiments, the controlled data is retrieved from a local memory of a computer server implementing process 500. In other embodiments, the controlled data can be retrieved from a remote storage such as a network attached storage ("NAS") or a storage area network ("SAN").

The controlled data can then be provided to the party providing the token in 560. The controlled can be provided to the party providing the token by various methods. For example, the controlled data can be provided a part of a web page sent to an internet browser running on a user terminal. In other embodiments, a user terminal can be authorized to access a database. In yet other embodiments, controlled data can be linked inline and/or framed from a web page such as, for example, a web page provided by a partner application.

In some embodiments, steps of process 500 can be rearranged. In some embodiments, more or fewer steps comprise process 500. For example, in one embodiment, no application specific data is extracted from the token. In another embodiment, application specific information associated with a party is included in the token and is used to determine whether the party is authorized to access controlled data.

Figure 6:
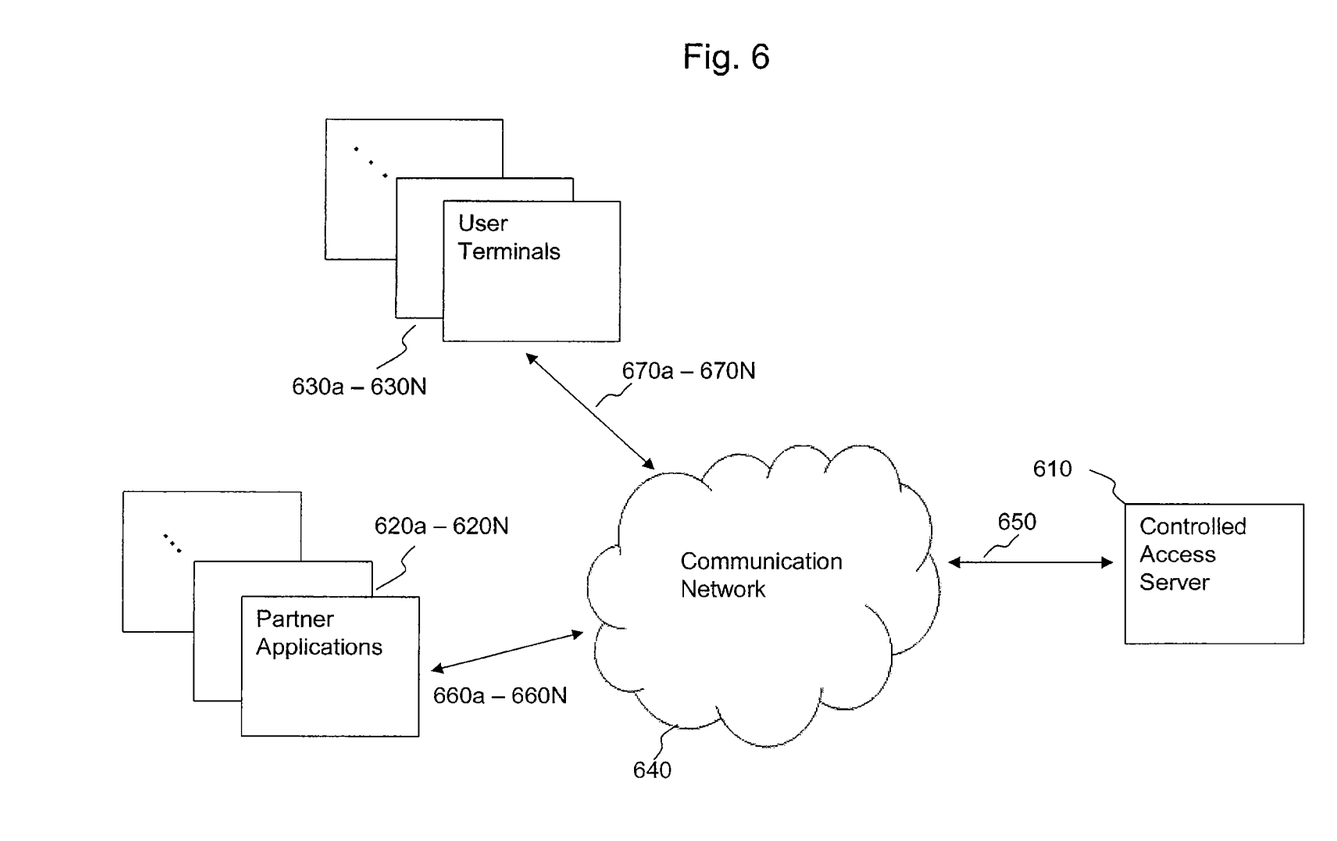
FIG. 6 is a block diagram of a system for providing authorized validated access to data to multiple computer terminals over a communication network, according to an embodiment.

FIG. 6 is a block diagram of a system for providing authorized validated access to data to multiple computer terminals over a communication network, according to an embodiment. As illustrated in FIG. 6, controlled-access server 610, partner applications 620a-620N and user terminals 630a-630N are operatively coupled to communication network 640. Communication network 640 can be any communications network configurable to allow controlled-access server 610, partner applications 620a-620N and user terminals 630a-630N to communicate with communication network 640.

Controlled-access server 610 is operatively coupled to communication network 640 via network connection 650, partner applications 620a-620N are operatively coupled to communication network 640 via network connections 660a-660N, and user terminals 630a-630N are operatively coupled to communication network 640 via network connection 670a-670N. Network connections 650, 660a-660N and 670a-670N can be any appropriate network connections for operatively coupling controlled-access server 610, partner applications 620a-620N and user terminals 630a-630N to communication network 640.

As illustrated in FIG. 6, controlled-access server 610 can communicate with partner applications 620a-620N via communication network 640. Also, partner applications 620a-620N can communicate with user terminals 630a-630N via communication network 640.

User terminals 630a-630N can be, for example, personal computers operated by many different users accessing one or more partner applications. In some embodiments, partner applications 620a-620N are multiple computer servers, each hosting a single software application configured to communicate with controlled-access server 610, that are distributed geographically to provide redundancy for faster access or greater reliability to user terminals 630a-630N accessing partner applications 620a-620N. In some embodiments, partner applications 620a-620N are multiple computer servers, each hosting a different software application configured to communicate with controlled-access server 610, and user terminals 630a-630N can access one or more of partner applications 620a-620N.

Figure 7:
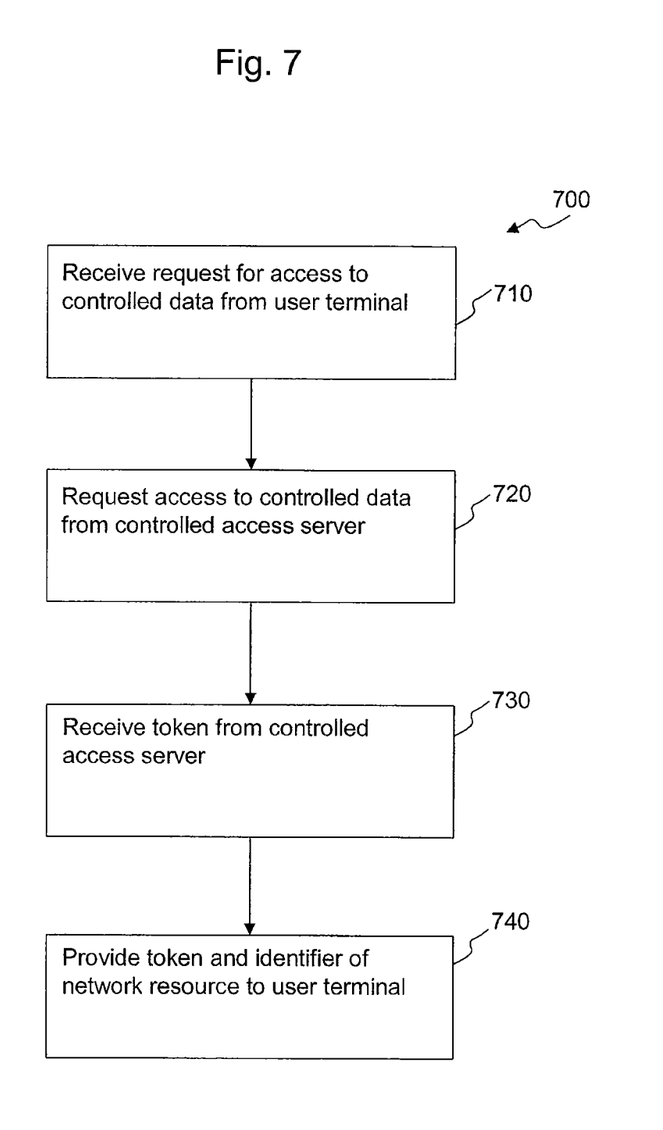
FIG. 7 is a flow chart of a process of requesting access to controlled data, according to an embodiment.

FIG. 7 is a flow chart of process 700 for requesting access to controlled data, according to an embodiment. Process 700 can be implemented by, for example, a partner application configured to request tokens from a controlled-access server. A request for access to controlled data is received from a user terminal at 710. The request can be, for example, an indication that a user of a web page has clicked on or selected a particular icon or portion of the web page.

After the request for access to controlled data is received, access to controlled data is requested from a controlled-access server at 720. In some embodiments, a partner application requests access to controlled data by requesting a token for accessing the controlled data. In other embodiments, a partner application requests access to controlled data and is provided with a token for accessing controlled data.

The token is received from the controlled-access server at 730. In some embodiments, a reference or identifier of a resource for accessing controlled data is also received from the controlled-access server. For example, the controlled-access server can send a URI of a web page for accessing the controlled data to a partner application.

At 740, the token and an identifier of a network resource for accessing the controlled data are sent to the user terminal. In some embodiments, the identifier of the network resource is included in the token and not sent separately to the user terminal. In some embodiments, the token and identifier are sent to the user terminal such that the user terminal is redirected to the network resource and provides the token to the network resource. For example, a partner application and provide a URI including the token and a redirect command to a browser running on a user terminal. The redirect command causes the browser to be redirected to the URI and provide the token to a web page referenced by the URI. In some embodiments, only a portion of a visible portion of a browser is redirected. For example, the redirection can be implemented as an inline link in a web page associated with the partner application.

In some embodiments, a partner application implements a process with more or fewer steps than those in process 700. For example, a partner application can receive additional data from a user terminal such as, for example, user data. In some embodiments, a partner application can send data associated with a user of a user terminal to a controlled-access server such that the data is included in the token.

In some embodiments, a partner application authenticates a user terminal. For example, a partner application can require a username and a password from a user terminal before allowing a user terminal to request access to controlled data. In other embodiments, a partner application requires a digital certificate from a user terminal for authentication. In yet other embodiments, a partner application does not authenticate a user terminal.

In one embodiment, a partner application is an online dating service that allows users to define profiles, view profiles of other members of the dating service, send messages to other members of the dating service and view verified information about other members of the dating service. A controlled-access server can be implemented by a third-party capable of collecting and/or verifying information about members of the dating service. For example, verified information can include employment status, location or address, relationship history, education background, criminal background, identity, physical characteristics such as age, height and/or weight, an image, a sound clip, and/or a video.

A member of the dating service can log onto a web site hosted by the partner application and can view web pages associated with other members. Such web pages can display a profile of other members. The member also can configure and/or customize his/her profile web page. In addition to customizing a profile web page, a member can request that information about him- or herself be verified by a third-party and hosted by a controlled-access server. In some embodiments, the partner application provides an interface to the member for requesting the verification. In other embodiments, the third-party and/or controlled-access server provides such an interface.

After the information requested by the member has been verified and stored on the controlled-access server, the partner application displays an icon on the member's profile web page that other members can select or click to access the verified or controlled information from the controlled-access server. For example, the profile web page of a member can include an image of that member and an icon of a camera partially overlaid on the image. When a member clicks on the camera image, a verified image is accessed from the controlled-access server (as described above) and is displayed to the member.

In some embodiments, when a member clicks on an icon to request access to verified information about another the member, the partner application provides information associated with the requesting member to the controlled-access server. For example, the partner application can send a identifier such as a username to the controlled-access server as part of the request for a token. In some embodiments, the username can be included in a token and be recorded by the controlled-access server prior to providing verified information. In some embodiments, the name of the partner application is included in the token and the controlled-access server records the name of the partner application prior to providing verified information. In some embodiments, a username of the member with whom the verified information is associated is included in a token and the controlled-access server records the name of the partner application prior to providing verified information. The verified information can then be provided according to the processes and methods described above in relation to FIGS. 1-7. In some embodiments, a username can be used as a reference to the verified information.

In one embodiment, the partner application is an employment search service that allows users to register personal profiles and allows employers to search the profiles for potential employees. A controlled-access server can include verified information such as educational history, employment history, criminal background, professional achievements, admissions and/or awards, and/or reviews from previous employers.

In another embodiment, the partner application is a service for managing applicants to a university, professional school, and/or organization. Applicant provided information such as, for example, educational history, work experience, personal essays, letters of recommendation, work samples and/or educational transcripts. Some information such as, for example, educational transcripts, educational history, and/or work experience can be optionally verified by a third-party and stored on a controlled-access server. The party reviewing the applicants, can access the verified information from the controlled access server as described above. The presence of verified information can increase confidence in the service and reduce overstating or mischaracterization of experience and/or academic achievement by applicants.

In another embodiment, the partner application is an application or service for managing status in an organization. For example, the partner application can be a web site for a private club, school or other organization. Users of the partner application can optionally log onto the web site and view some information about members of, for example, a private club. The web site can include icons for accessing controlled or verified information such as, for example, membership attributes, contact information, images, or other information as described above.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to social-networking and/or dating services can be applicable in other contexts such as employment services. Thus, features described with reference to one or more embodiments can be combined with other embodiments described herein.

What is claimed is:

1. A method, comprising:
receiving by a computer processor from a first party, a request for access to controlled data;
sending from the computer processor to the first party a token at a first time, the token including a first data set associated with authorized access to the controlled data;
receiving at the computer processor from a second party and not from the first party a request for the controlled data at a second time, the request from the second party including the token, the second time being no earlier than the first time; and
sending from the computer processor a signal such that the second party and not to the first party is provided access to the controlled data based on the token.

2. The method of claim 1, further comprising:
encrypting the token before the first time such that the first data is inaccessible to the first party and the second party; and
decrypting the token after the second time.

3. The method of claim 1, further comprising providing to the first party an identifier associated with a resource and including the token, the resource being configured to provide access to the controlled data based on the token.

4. The method of claim 1, wherein the first data set is authentication data for an application at the first party, the token includes a second data set different from the first data set, the second data set is application data for the application at the first party.

5. The method of claim 1, further comprising determining whether the first party is authorized to request access to the controlled data based on a predetermined identifier associated with first party.

6. The method of claim 1, wherein the first data set is associated with authorized access to the controlled data by a plurality of parties.

7. The method of claim 1, wherein the request includes a request for a token associated with the controlled data when the first party does not have access to the controlled data.

8. The method of claim 1, wherein the first data set includes data associated with an indication of a valid token at the first time.

9. The method of claim 1, wherein:
the first party is a web site providing access to an indication of availability of controlled data; the second party is a user terminal accessing the first party; and
the controlled data is data associated with a third party different from the first party and the second party.

10. An apparatus, comprising:
an interface configured to be operatively coupled to a communication network;
a memory, the memory being configured to store controlled data; and
a computer processor operatively coupled to the interface and the memory, the computer processor having a token module configured to receive from a first party over the communication network a request for a token associated with the controlled data, the token module configured to provide to the first party over the communication network the token at a first time,
the computer processor having a data access module configured to receive from a second party and not from the first party over the communication network the token at a second time, the second time being no earlier than the first time, the data access module configured to provide to the second party and not to the first party access to the controlled data over the communication network based on the token.

11. The apparatus of claim 10, wherein the token module is further configured to generate and encrypt the token before the first time, the data access module is further configured to decrypt the token after the second time.

12. The apparatus of claim 10, wherein the token module is further configured to determine whether the first party is authorized to request a token based on a predetermined identifier associated with the first party.

13. The apparatus of claim 10, wherein the token module is further configured to send to the first party an identifier associated with a resource, the resource being configured to provide access to the controlled data based on the token.

14. The apparatus of claim 10, wherein the token module is further configured to include a first data set and a second data set in the token, the first data set being authentication data for an application at the first party, the second data set being different from the first data set, the second data set being application data for the application at the first party.

15. The apparatus of claim 10, wherein the data access module is further configured to determine whether the token received from the second party is valid based on data associated with authorized access to the controlled data included in the token.

16. A method, comprising:
receiving at a first party from a second party a request for access to controlled data at a first time;
sending from the first party to a computer processor a request for access to the controlled data at a second time, the second time being no earlier than the first time;
receiving at the first party by the computer processor a token after the second time, the token including a first data set associated with authorized access to the controlled data; and
sending from the first party to the second party the token and an identifier associated with a resource such that the second party is directed to the resource without being directed through the first party and the second party provides the token to the resource to access the controlled data without the token being provided to the first party, the token configured such that the resource provides to the second party access to the controlled data based on the token.

17. The method of claim 16, further comprising sending from the first party to the computer processor (1) authentication data associated with the second party, and (2) application data for an application at the first party such that the authentication data associated with the second party and the application data associated with the application at the first party is included in the token.

18. The method of claim 16, wherein the token is included in the identifier associated with the resource.

19. The method of claim 16, further comprising authenticating the second party before the first time.

20. The method of claim 16, further comprising: providing to the second party uncontrolled data associated with an individual before the first time; and providing to the second party an indication associated with availability of controlled data associated with the individual before the first time.

21. The method of claim 16, wherein:
the second party is a user terminal accessing a web site, the web site including an indication of availability of the controlled data;
the computer processor is included in a computer server storing the controlled data and providing the resource for access to the controlled data; and
the controlled data is data associated with the first party different from the second party and the processor.

* * * * *